(12) United States Patent
Ouchi

(10) Patent No.: US 9,408,017 B2
(45) Date of Patent: Aug. 2, 2016

(54) COMMUNICATION APPARATUS, CONTROL METHOD, AND STORAGE MEDIUM

(71) Applicant: CANON KABUSHIKI KAISHA, Tokyo (JP)

(72) Inventor: Masatomo Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 14/305,317

(22) Filed: Jun. 16, 2014

(65) Prior Publication Data

US 2014/0378059 A1    Dec. 25, 2014

(30) Foreign Application Priority Data

Jun. 25, 2013    (JP) ................................. 2013-133093

(51) Int. Cl.
*H04B 7/00* (2006.01)
*H04W 4/00* (2009.01)

(52) U.S. Cl.
CPC ............... *H04W 4/008* (2013.01); *Y02B 60/50* (2013.01)

(58) Field of Classification Search
CPC ...... H04W 4/008; H04W 4/00; G06F 3/1292; G06F 3/1236
USPC ..................... 455/41.2, 41.1, 574, 522, 343.5
See application file for complete search history.

(56) References Cited

U.S. PATENT DOCUMENTS

| 6,150,953 | A * | 11/2000 | Tanaka | H04L 29/06 340/3.1 |
| 8,107,478 | B2 * | 1/2012 | Naito | H04L 45/22 370/394 |
| 8,825,767 | B2 * | 9/2014 | Sivakeesar | H04L 12/1818 370/328 |
| 8,897,197 | B2 * | 11/2014 | Huang | 370/312 |
| 9,007,959 | B2 * | 4/2015 | Verma | H04W 84/20 370/254 |
| 9,019,974 | B2 * | 4/2015 | McCann | H04W 76/022 370/401 |
| 9,020,428 | B2 * | 4/2015 | Meunier | H04B 1/401 455/41.1 |
| 2008/0261663 | A1 * | 10/2008 | Park | H04W 52/0229 455/574 |
| 2011/0082940 | A1 * | 4/2011 | Montemurro | H04L 69/24 709/227 |
| 2013/0250825 | A1 * | 9/2013 | Gosal | H04W 52/0232 370/311 |
| 2013/0301497 | A1 * | 11/2013 | Gonikberg | H04W 4/008 370/311 |
| 2014/0206346 | A1 * | 7/2014 | Kiukkonen | H04W 52/0229 455/426.1 |
| 2014/0320908 | A1 * | 10/2014 | Iwauchi | H04L 45/24 358/1.15 |

FOREIGN PATENT DOCUMENTS

| JP | 2005-064822 A | 3/2005 |
| JP | 2007-306201 A | 11/2007 |
| JP | 2008-283590 A | 11/2008 |
| JP | 2010-028753 A | 2/2010 |
| JP | 2010-178002 A | 8/2010 |
| JP | 2010-273226 A | 12/2010 |

* cited by examiner

*Primary Examiner* — Marceau Milord
(74) *Attorney, Agent, or Firm* — Fitzpatrick, Cella, Harper & Scinto

(57) ABSTRACT

A communication apparatus having a first communication function of periodically transmitting a predetermined signal and communicating with another apparatus and a second communication function of communicating with another apparatus by producing an electric field or magnetic field determines whether a partner apparatus exists in a communicable range of the second communication function, and controls the first communication function to stop transmission of the predetermined signal in the case where it is determined that the partner apparatus exists in the communicable range.

21 Claims, 13 Drawing Sheets

F I G. 7
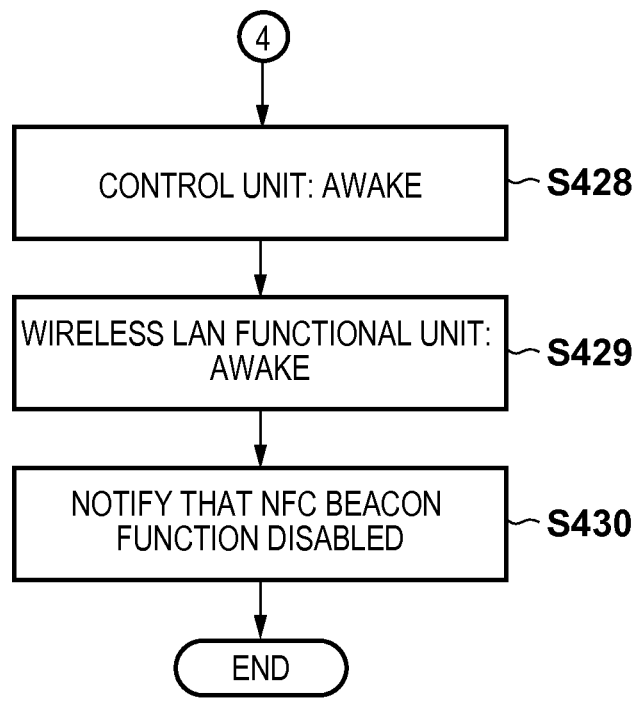

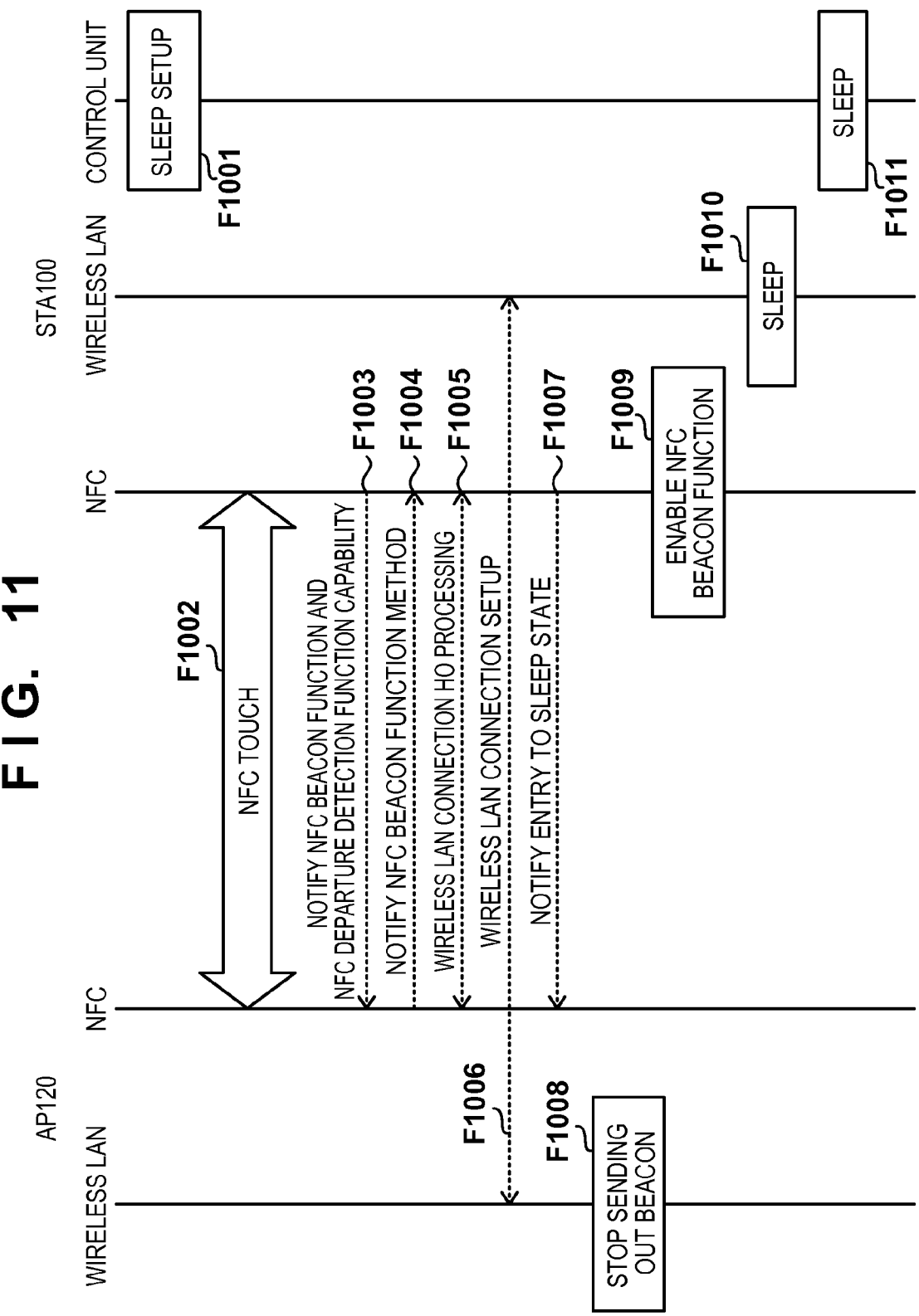

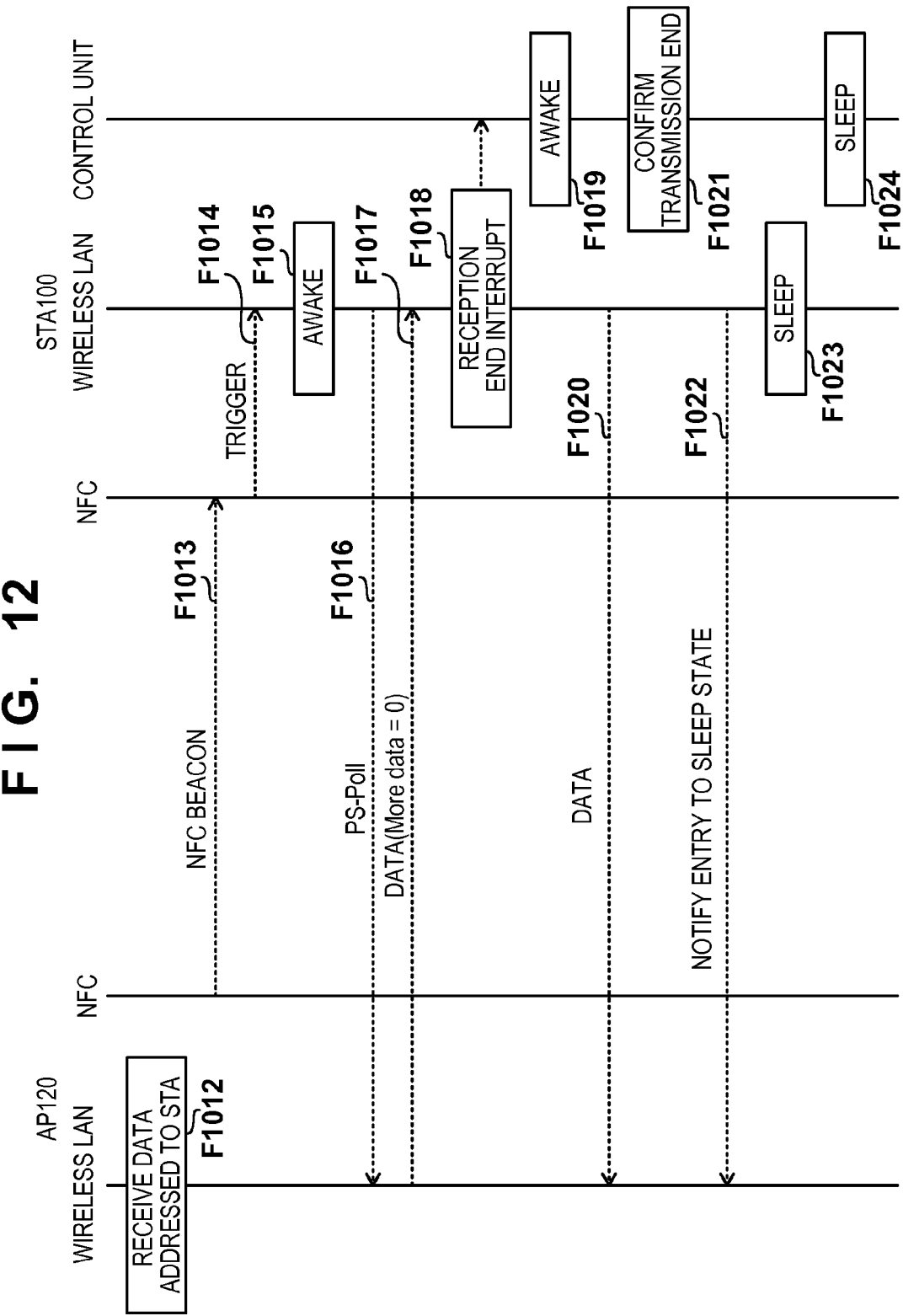

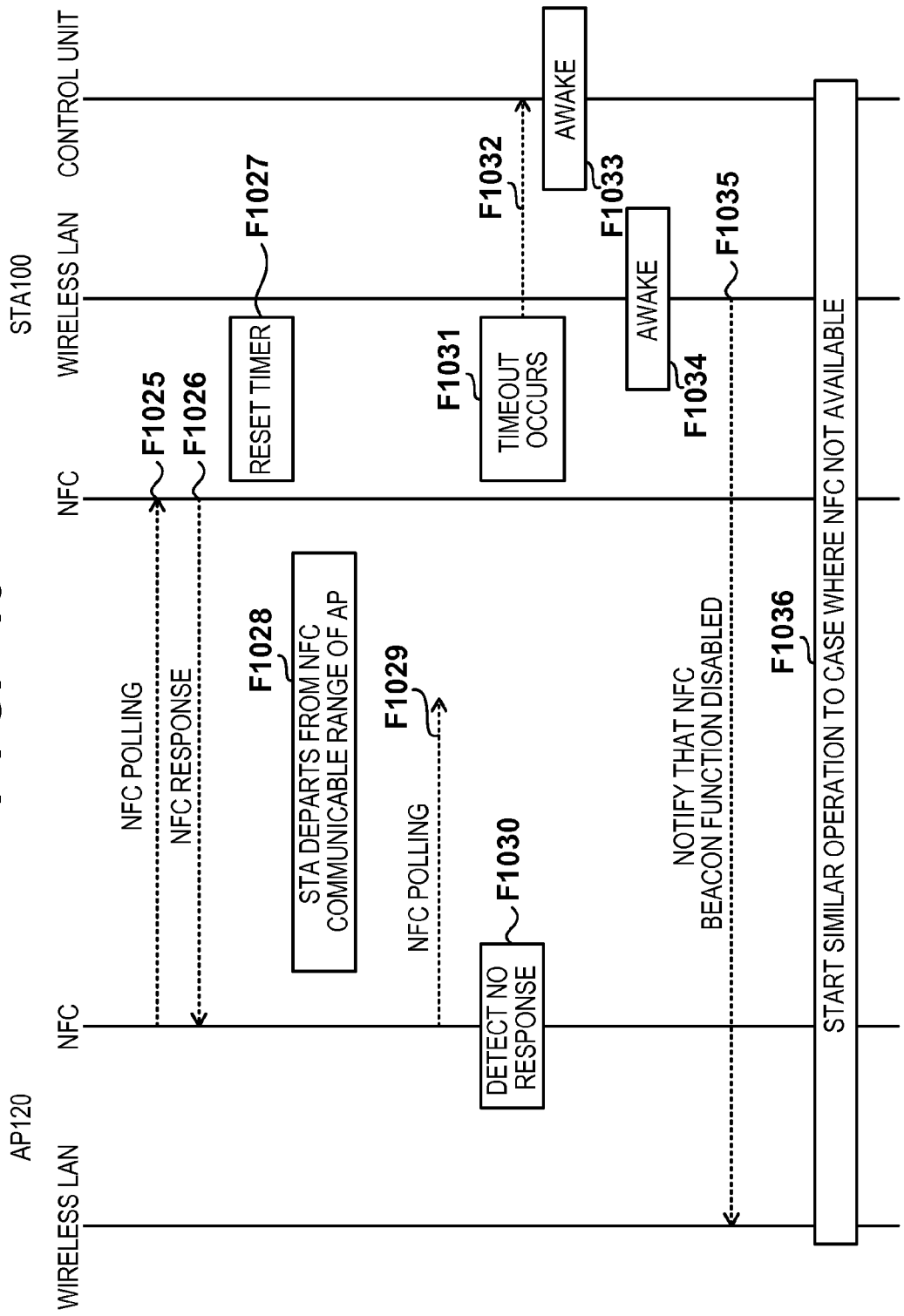

COMMUNICATION APPARATUS, CONTROL METHOD, AND STORAGE MEDIUM

BACKGROUND OF THE INVENTION

1. Field of the Invention

The present invention relates to a power saving technology for application in the case where a plurality of communication methods are available.

2. Description of the Related Art

In recent years, the number of mobile terminals equipped with a near field communication (NFC) function that is defined by the NFC Forum and can be used for settling accounts and the like have been increasing. Meanwhile, in order to transmit or receive large amounts of data, an increasing number of mobile terminals have wireless LAN communication functions conforming to the IEEE 802.11 standard, for example.

Increased power consumption is a problem when these wireless communication functions are left on all the time. In response to this, Japanese Patent Laid-Open No. 2008-283590 discloses a technology for suppressing power consumption of the wireless LAN function by using NFC to perform communication required to set up a wireless LAN connection. Also, Japanese Patent Laid-Open No. 2010-028753 discloses a technology that, in order to suppress power consumption by a proximity wireless communication function, provides the communication apparatus with a proximity detection function having lower power consumption than the wireless communication function, and returns the wireless communication function from a sleep state in the case where another apparatus is detected in proximity. Furthermore, Japanese Patent Laid-Open No. 2007-306201 discloses placing the wireless LAN function in the sleep state as a rule, in order to reduce power consumption when wireless LAN communication is not being performed, and activating the wireless LAN function of a partner apparatus using wireless communication having low power consumption in the case where data communication is required.

However, there is a problem with the technology disclosed in Japanese Patent Laid-Open No. 2007-306201 in that, in order for the communication function that uses wireless LAN to be activated, it is necessary to maintain a state in which communication by wireless communication having low power consumption is possible at all times. That is, placing the communication function that uses wireless LAN in the sleep state is premised on the wireless communication having low power consumption being in a communicable state, and no consideration whatsoever is given to the state of the wireless communication having low power consumption.

The present invention has been made in view of the above problem, and provides a power saving technology for an apparatus that is capable of using a plurality of communication methods.

SUMMARY OF THE INVENTION

According to one aspect of the present invention, there is provided a communication apparatus having a first communication unit configured to periodically transmit a predetermined signal and communicate with another apparatus and a second communication unit configured to communicate with another apparatus by producing an electric field or magnetic field, comprising: a determination unit configured to determine whether a partner apparatus exists in a communicable range of the second communication unit; and a control unit configured to control the first communication unit to stop transmission of the predetermined signal in a case where it is determined that the partner apparatus exists in the communicable range.

According to one aspect of the present invention, there is provided a communication apparatus having a first communication unit configured to communicate wirelessly with another apparatus and a second communication unit configured to perform at least one of receive power reception from another apparatus or communicate communication with the other apparatus by an electric field or magnetic field produced by the other apparatus, comprising: a determination unit configured to determine whether the communication apparatus exists in a communicable range of a second third communication unit of the partner apparatus, which is corresponding to the second communication unit; and a control unit configured to control the first communication unit to enter a sleep state, in a case where it is determined that the communication apparatus exists in the communicable range.

Further features of the present invention will become apparent from the following description of exemplary embodiments with reference to the attached drawings.

BRIEF DESCRIPTION OF THE DRAWINGS

FIG. 7 is a flowchart showing fourth processing by the STA.

FIG. 11 is a first sequence diagram showing the flow of processing executed by the STA and the AP.

FIG. 12 is a second sequence diagram showing the flow of processing executed by the STA and the AP.

FIG. 13 is a third sequence diagram showing the flow of processing executed by the STA and the AP.

DESCRIPTION OF THE EMBODIMENTS

An exemplary embodiment(s) of the present invention will now be described in detail with reference to the drawings. It should be noted that the relative arrangement of the components, and the numerical expressions and numerical values set forth in these embodiments do not limit the scope of the present invention unless specifically stated otherwise.

System Configuration

Figure 1:
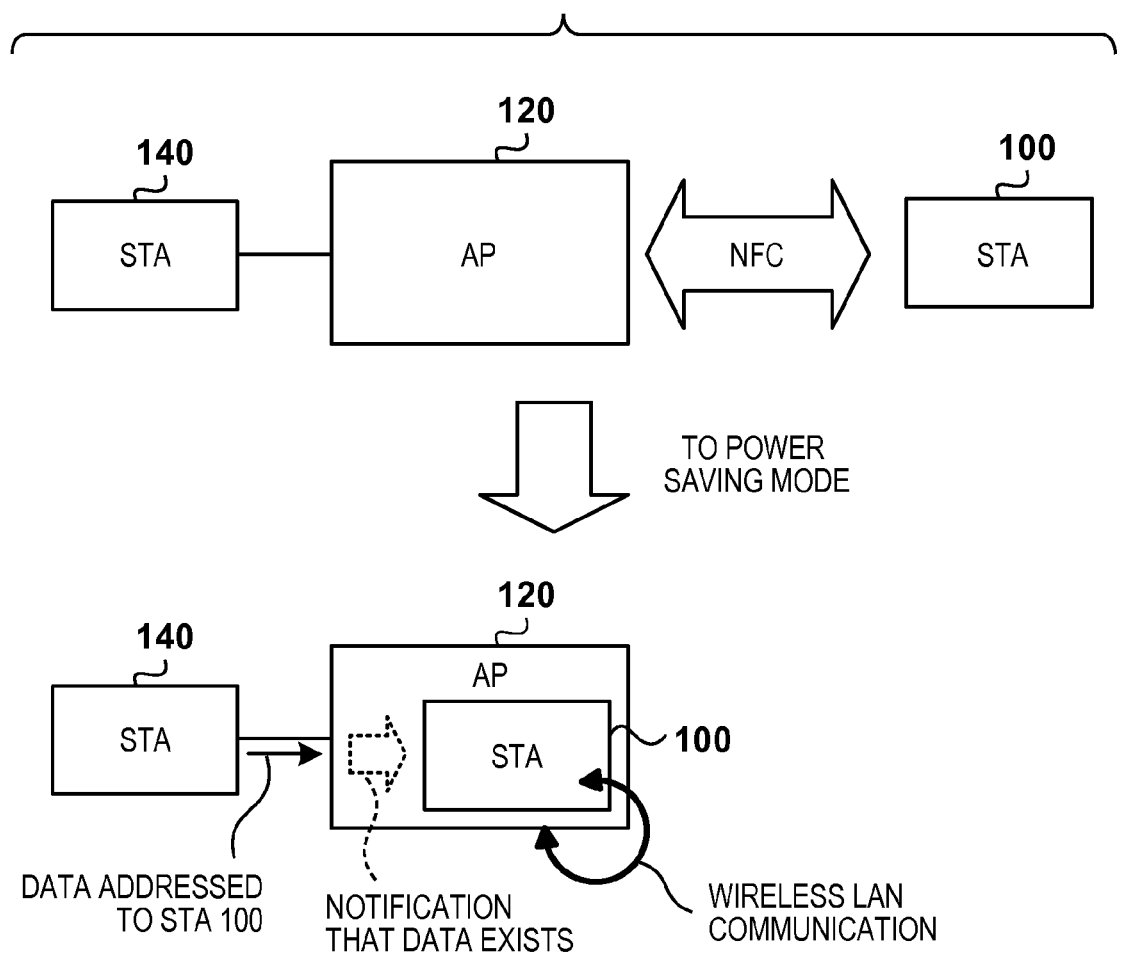
FIG. 1 is a diagram showing an exemplary configuration of a wireless communication system.

An exemplary configuration of a wireless communication system according to the present embodiment is shown in FIG. 1. The wireless communication system includes, for example, as shown in FIG. 1, a first communication apparatus (STA 100), a second communication apparatus (AP 120), and a third communication apparatus (STA 140). In the present embodiment, the STA 100 and the AP 120 have a first communication function that uses wireless LAN and a second communication function that uses NFC (Near Field Communication), and communicate with each other as partner apparatuses. Note that AP denotes an access point in wireless LAN communication, and STA denotes a station (terminal) in wireless LAN communication.

The STA 100 and the AP 120 are able to communicate with each other using the first communication function, which conforms to the IEEE 802.11 standard, for example. Note that the STA 140 and the AP 120 may communicate wirelessly using the first communication function, or wired communication between the STA 140 and the AP 120 may be established via another AP, for example.

The AP 120 produces an electric field or magnetic field using the NFC function, and is able to at least one of communicate with the STA 100 and supply power to the STA 100. Similarly, the STA 100 is able to at least one of communicate with the AP 120 and receive power that is supplied from the AP 120, by using the electric field or magnetic field produced by the AP 120 using the NFC function. Note that it is possible for the STA 100 to be able to produce an electric field or magnetic field using an NFC function and communicate with the AP 120 or supply power to the AP 120, and for the AP 120 to be able to communicate or receive power using the electric field or magnetic field produced by the STA 100. Note that, unless stated otherwise, the NFC function is assumed to conform to the standards of the NFC Forum.

In the present embodiment, when the STA 100 and the AP 120 exist in the communicable range of the NFC function as a result of the STA 100 moving in proximity to the AP 120, the STA 100 and the AP 120 perform control for causing the first communication function that uses wireless LAN to enter the sleep state. Note that the sleep state referred to here is a state in which the wireless LAN function is turned OFF in the STA 100, and is, furthermore, a state in which the AP 120 does not periodically transmit a predetermined signal such as a beacon, and the beacon reception function in the STA 100 is also stopped. That is, since the STA 100 also does not perform periodical activation for waiting for a beacon as a result of causing the wireless LAN function to enter the sleep state, power consumption relating to wireless LAN can be greatly reduced. Also, the STA 100, by also placing a control unit that controls the whole apparatus in the sleep state, enters a state in which only the NFC communication function can be driven. The NFC communication function, by being driven with power that is supplied from the AP 120, greatly reduces power consumption for the apparatus as a whole, with zero power consumption being possible in some cases.

When the STA 100 moves out of the communicable range of the NFC function after the wireless LAN has entered the sleep state, the STA 100 and the AP 120 perform control so as to cancel the sleep state of the first communication function that uses wireless LAN and activate communication by wireless LAN. Also, when data addressed to the STA 100 reaches the AP 120 from the STA 140, for example, after the wireless LAN has entered the sleep state, the AP 120 uses the NFC function to notify the STA 100 that there is data to be transmitted. The STA 100 and the AP 120 activate the wireless LAN communication function from the sleep state, and perform transmission and reception of the data. In the case where the STA 100 still exists in the communicable range of the NFC function of the AP 120 after transmission/reception of the data, the wireless LAN function is caused to enter the sleep state.

It thereby becomes possible for the STA 100 and the AP 120 to cause the wireless LAN communication function to enter the sleep state or to activate the wireless LAN communication function from the sleep state, according to whether the STA 100 exists within the communicable range of the NFC function of the AP 120. Also, since it is possible to communicate using NFC when the wireless LAN communication function is in the sleep state, it is possible, in the case where there is data to be transmitted, to notify the partner apparatus that the data exists using the NFC function. Hereinafter, each apparatus that performs this processing and the processing that is executed will be described in detail.

Configuration of STA 100

Figure 2:
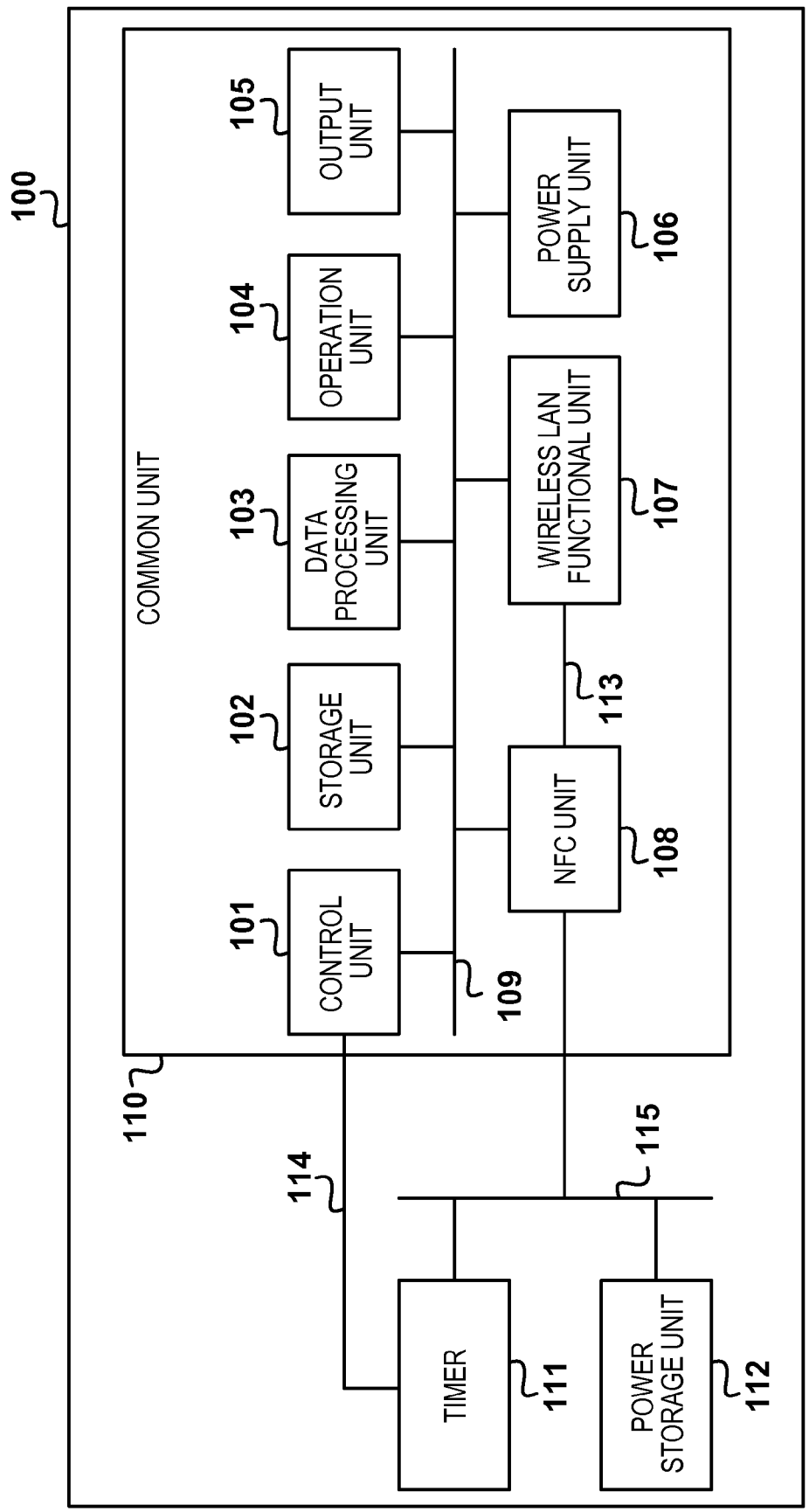
FIG. 2 is a block diagram showing an exemplary configuration of a first communication apparatus (STA).

An exemplary configuration of a first communication apparatus (STA 100) is shown in FIG. 2. The STA 100 has, for example, a timer 111, a power storage unit 112, and a common unit 110 of which the AP 120 has a similar function. Also, the common unit 110 has a control unit 101, a storage unit 102, a data processing unit 103, an operation unit 104, an output unit 105, a power supply unit 106, a wireless LAN functional unit 107, and an NFC unit 108. These functional units are connected, as shown in FIG. 2, by a bus 109 and other wirings 113 to 115.

The control unit 101 is a functional unit that executes control programs stored in the storage unit 102, and is constituted by a CPU or the like, for example. The storage unit 102 stores control programs that are executed by the control unit 101, data for performing control, and the like. The storage unit 102 is constituted by a nonvolatile ROM, a volatile RAM, or the like. Controls discussed later are executed by the control unit 101 executing control programs stored in the storage unit 102. The data processing unit 103 executes signal processing, calculations, clocking, and the like. The operation unit 104 is a functional unit that detects user operations, and consists of buttons, a mouse, a touch panel, and the like. The output unit 105 is constituted by a display, a speaker output, and the like. The power supply unit 106 supplies power to the functional units of the STA 100.

The wireless LAN functional unit 107 is a functional unit for executing wireless LAN communication, and is, for example, a module consisting of an LSI, an antenna or the like that incorporates a control function relating to wireless LAN. The NFC unit 108 is a functional unit for executing NFC communication, and is, for example, a module consisting of an LSI, an antenna or the like that incorporates a control function relating to NFC.

The timer 111 is initialized (reset) by a confirmation signal (e.g., NFC polling) being received in the NFC unit 108 from a partner apparatus, and measures elapsed time after being reset. The timer 111 then gives an interrupt signal to the control unit 101, in the case where the elapsed time that is measured exceeds a predetermined value. The power storage unit 112, which is, for example, constituted by a capacitor, stores power received by the NFC unit 108 and continuously operates the timer 111.

Configuration of AP 120

Figure 3:
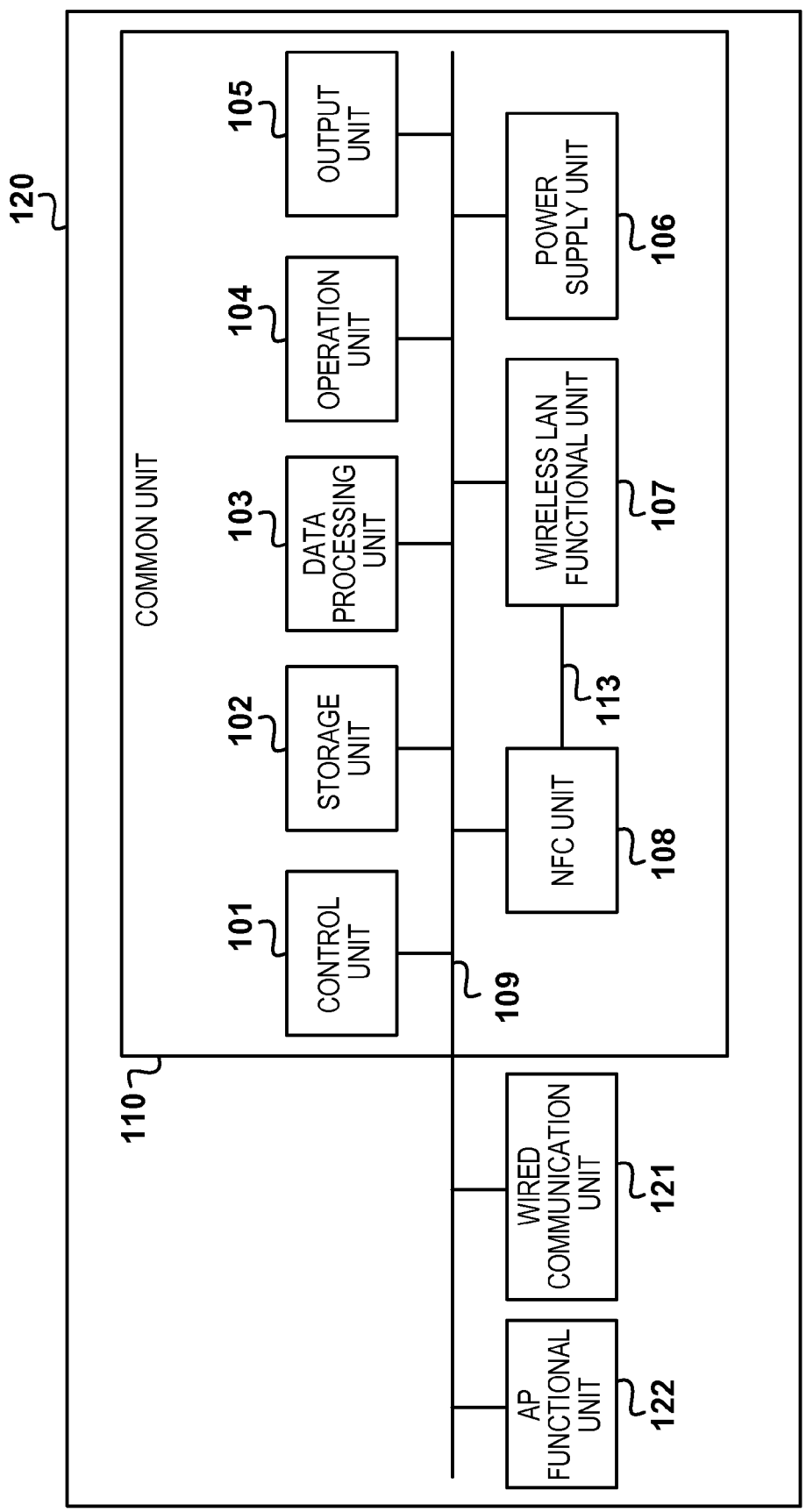
FIG. 3 is a block diagram showing an exemplary configuration of a second communication apparatus (AP).

FIG. 3 shows an exemplary configuration of the second communication apparatus (AP 120). The AP 120 has, for example, a wired communication unit 121, an AP functional unit 122, and a common unit 110. The wired communication unit 121 communicates using Ethernet™. The AP 120 is connected by a cable to a network, for example, and in the case where a signal is received from the network, that signal is received by the wired communication unit 121. The AP functional unit 122 is a functional unit for executing the function of an access point that does not exist in the STA 100. Note that the functions of the common unit 110 are common to the STA 100.

The control unit 101 of the STA 100 operates while transitioning between the sleep state in which power is not consumed and an awake state in which power is consumed. The control unit 101 of the STA 100 transitions to the awake state upon receiving an event, an interrupt or the like in the sleep state. At this time, the control unit 101 of the STA 100 can be restored to the state immediately before entering the sleep state by loading settings information, for example.

The STA 100 also has a sleep state and an awake state, similarly to the control unit 101, for the wireless LAN functional unit 107. Note that the wireless LAN functional unit 107, in the sleep state, is unable to transmit and receive signals, since the high frequency circuit for use in communication is stopped. Furthermore, in a general doze state, the reception circuit is operated according to a cyclic timer, but in the sleep state described hereinafter it is assumed that such a timer operation is also not executed. That is, it is assumed that the wireless LAN functional unit 107 does not have a function of autonomously operating the high frequency circuit, and is returned to the awake state by being activated by another functional unit.

Note that, hereinafter, description will be given assuming that the wireless LAN functional unit 107 of the STA 100 is in the sleep state but that the wireless LAN functional unit 107 of the AP 120 is not in the sleep state even though periodical transmission of a beacon is stopped. However, the wireless LAN functional unit 107 of the AP 120 may also be caused to enter the sleep state to realize a further reduction in the power consumption of the AP 120.

Operations of STA 100

The processing that is executed by the STA 100 is broadly divided into four types of processing. The first processing is "processing from initial setup to entering sleep state", the second processing is "routine processing in the sleep state", the third processing is "processing when there is reception data", and the fourth processing is "NFC departure detection and related processing". Hereinafter, these four types of processing will be described using FIGS. 4 to 7, respectively.

1. Processing from Initial Setup to Entering Sleep State

Figure 4:
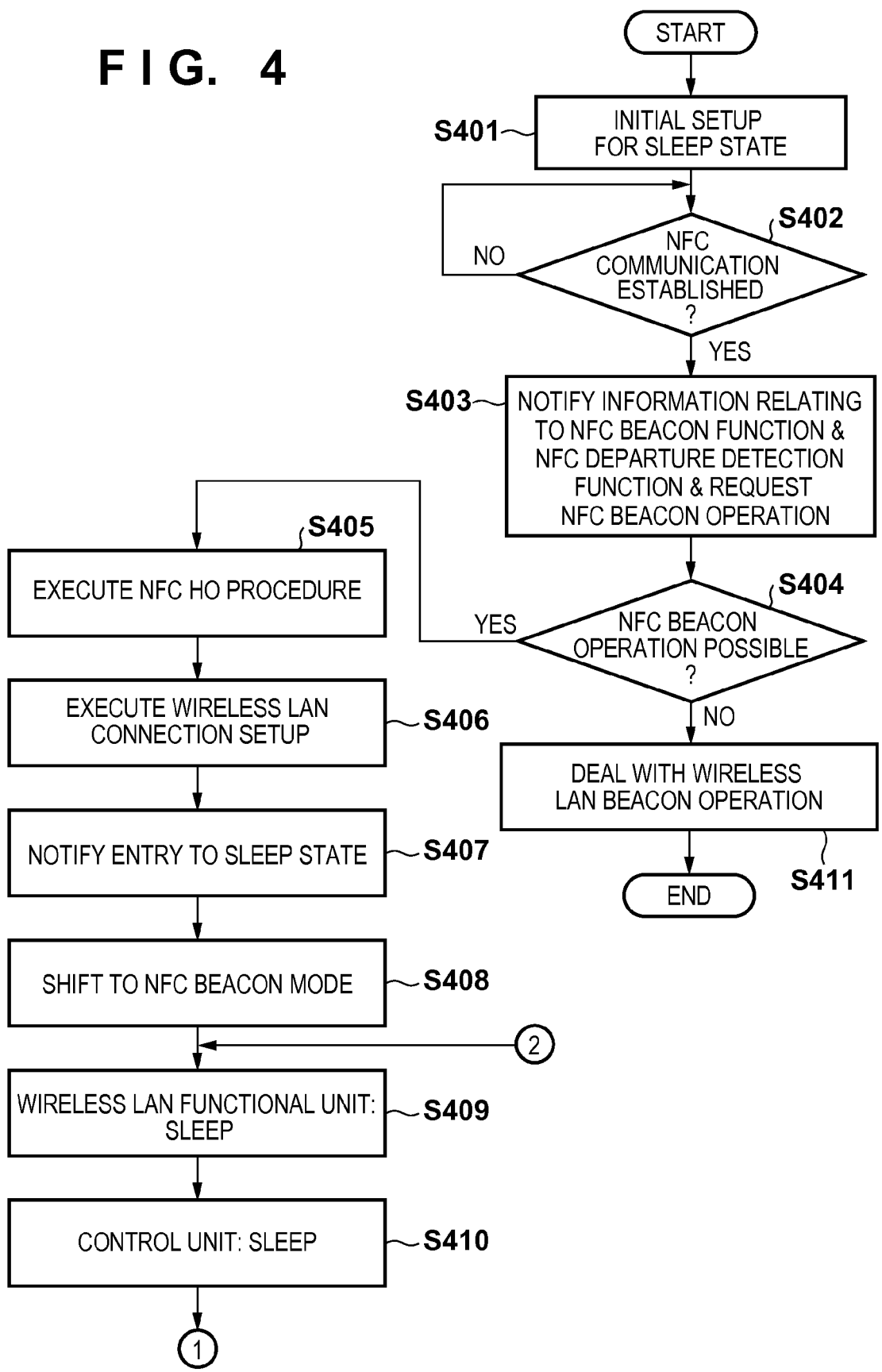
FIG. 4 is a flowchart showing first processing by the STA.
Figure 5:
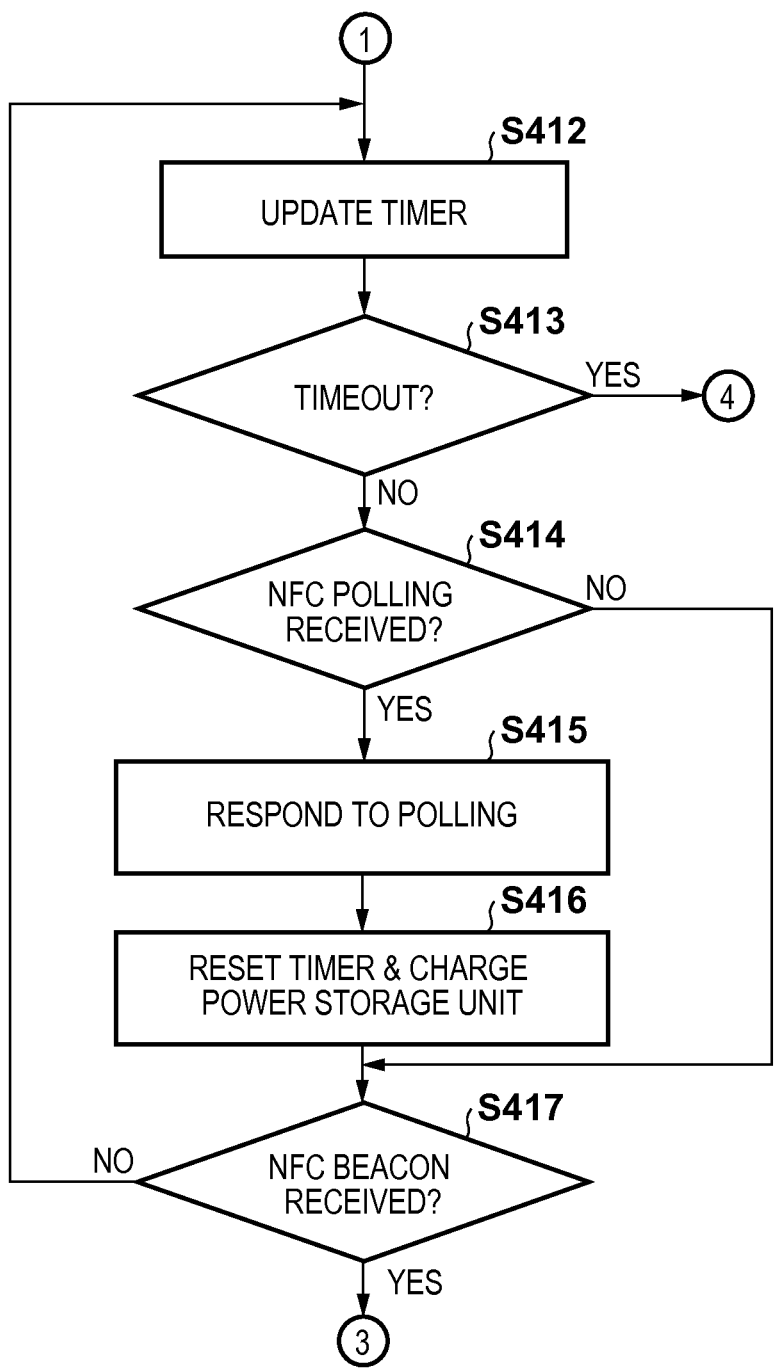
FIG. 5 is a flowchart showing second processing by the STA.
Figure 6:
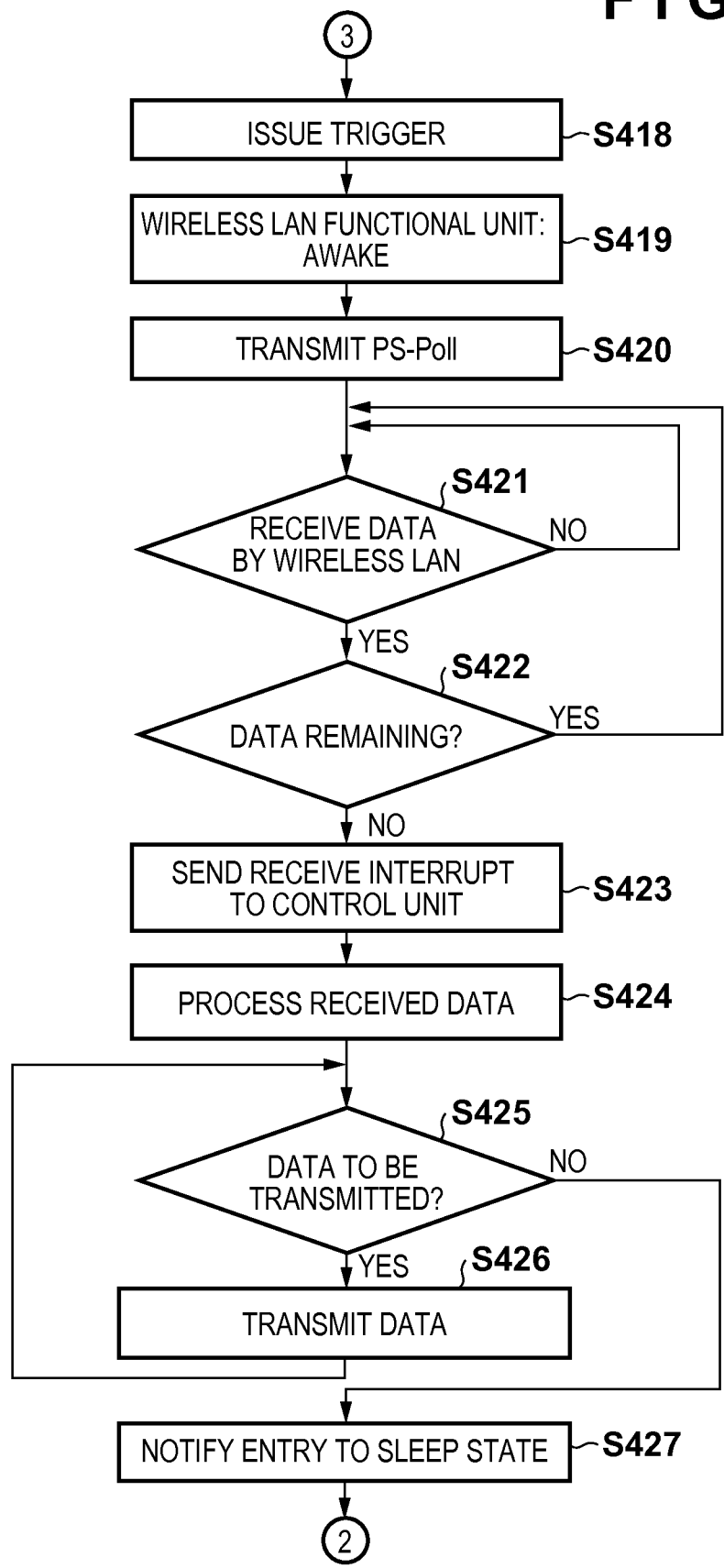
FIG. 6 is a flowchart showing third processing by the STA.

The operation of the first processing is shown in FIG. 4. Note that at the time of starting the processing of FIG. 4, it is assumed that the STA 100 operates the NFC unit 108 in a two-way communication mode, and that the wireless LAN functional unit 107 is in a reception state. Also, it is assumed that the control unit 101 of the STA 100 is in an idle state of waiting for an event from the functional units.

Note that the NFC unit 108, in the two-way communication mode, is able to perform at least one of communicating with a partner apparatus and supplying power to a partner apparatus by producing electromagnetic coupling itself. The two-way communication mode in NFC is also called active mode or reader/writer mode. Note that the NFC unit 108 is also able to operate in a passive mode. The NFC unit 108, in the passive mode, is driven by electromagnetic coupling energy produced by a partner apparatus, and is able to perform at least one of communication and power reception. Note that the passive mode is also called a tag/card emulation mode.

When processing is started, the STA 100 first performs initial setup for the sleep state (S401). Initial setup includes setting the NFC polling method and the temporal conditions for NFC departure in the wireless LAN functional unit 107 and the NFC unit 108. Note that it is assumed that the wireless LAN functional unit 107 and the NFC unit 108 are provided with a control function equivalent to the control unit 101. That is, it is assumed that the wireless LAN functional unit 107 and the NFC unit 108 are capable of operating without being instructed by the control unit 101 once they have been initialized by the control unit 101.

After initial setup, the control unit 101 determines whether a partner apparatus is in proximity using the NFC unit 108 (S402). When a partner apparatus is detected in proximity (YES at S402), the STA 100 notifies information relating to its "NFC beacon function" and "NFC departure detection function" to the partner apparatus (AP 120) (S403). For example, the STA 100 notifies that it has these functions, executable conditions (parameters), and the like to the AP 120. At the same time, the STA 100 requests that the partner apparatus execute the NFC beacon operation.

Here, the "NFC beacon function" is a function for receiving notification that wireless LAN data exists from the partner apparatus via the NFC unit 108, when the NFC unit 108 is operating in the passive mode, and conveying this notification to the wireless LAN functional unit 107 or the control unit 101. Note that methods of notifying that data exists by NFC include the following two methods, for example. The first method involves indicating the existence of wireless LAN data by accessing a certain specific tag type or card mode. The second method involves indicating the existence of data by writing a specific value in a specific area during card mode operation. The AP, which has the NFC beacon function, notifies at least the Traffic Indication Map (TIM), out of the information included in a normal wireless LAN beacon, to the partner apparatus (STA) by NFC communication. The TIM is an information element notifying that there is data to be transmitted to a terminal under a power save mode. Also, the "NFC departure detection function" is a function for returning the control unit 101 to the awake state when access by NFC does not occur for a given period of time, in the case where the NFC unit 108 is operating in the passive mode and the control unit 101 is operating in the sleep state.

The STA 100 determines whether the AP 120 accepted the NFC beacon operation request, after notifying information relating to the NFC beacon function and the NFC departure detection function to the AP 120 (S404). For example, the STA 100 determines whether the NFC beacon operation request was accepted by notification from the AP 120.

In the case where the AP 120 does not accept the NFC beacon operation request (NO at S404), the STA 100 deal with wireless LAN beacon operation (S411), and ends the processing. In this case, the STA 100 does not cause the wireless LAN function to enter the sleep state, due to being unable to determine whether the STA 100 exists within the communicable range of the NFC unit 108 of the AP 120. The STA 100 is thereby able to cause the wireless LAN functional unit 107 to enter the sleep state on condition of being communicable with the AP 120 by NFC, and is able to ensure that control of the wireless LAN functional unit 107 can be executed by NFC. That is, situations where communication using NFC cannot be performed can be prevented from arising, while maintaining the premise of performing state control of the wireless LAN functional unit 107 by NFC.

On the other hand, in the case where the AP 120 accepts the NFC beacon operation request (YES at S404), an NFC connection handover (HO) procedure is executed (S405). NFC connection handover is a procedure defined by the NFC Forum, and involves two communication apparatuses that have established NFC communication shifting from communication using NFC to communication using another wireless communication function such as wireless LAN. Hereinafter, this processing and procedure will be simply referred to as handover or HO.

Thereafter, the STA 100 executes wireless LAN connection setup with the AP 120 (S406). Note that this procedure may be omitted in the case where wireless LAN connection has already been established. After completion of connection setup, the STA 100, in the state where a wireless LAN connection is established with the AP 120, notifies the AP 120 that the wireless LAN communication function will be entering the sleep state (S407). Note that, at this time, the STA 100 holds the information relating to the wireless LAN functional unit 107 that is used in connecting to the AP 120 in the storage unit 102. In this way, the STA 100 is able to perform communication by wireless LAN immediately after activation from the sleep state, by performing connection setup with the AP 120 before causing the wireless LAN functional unit 107 to enter the sleep state. Note that notification of entering the sleep state may be performed using either wireless LAN or NFC.

Next, the control unit 101 of the STA 100 sets the NFC unit 108 so as to be able to deal with an NFC beacon (S408). The control unit 101 of the STA 100 then controls the wireless LAN functional unit 107 so as to enter the sleep state (S409). The control unit 101 then enters the sleep state (S410).

2. Routine Processing in Sleep State

This processing is executed by the NFC unit 108, the timer 111 and the power storage unit 112, after the control unit 101 has entered the sleep state. This processing will be described with reference to FIG. 5. In this processing, the timer 111 operates such that the timer is updated periodically (S412). Also, the timer 111 determines whether the timer value has reached a predetermined value set in order to timeout (S413), and, when the value of the timer 111 exceeds the predetermined value (YES at S413), interrupts the control unit 101. Thereafter, the processing shifts to the fourth processing which will be discussed later. Here, the period of the timer and the timeout value may be set at the stage of initial setup (S401) before causing the wireless LAN to enter the sleep state. Note that the timeout value of the timer 111 is set to a value greater than the time interval for transmitting a confirmation signal (NFC polling) for confirming whether the STA 100 exists in the communicable range of the NFC unit 108 of the AP 120. This is because a timeout will occur even when the STA 100 exists in the communicable range of the NFC unit 108 of the AP 120 when the timeout value is set to a value less than the time interval at which NFC polling is transmitted. Thus, the STA 100 may, for example, receive information indicating the transmission time interval of NFC polling from the AP 120, and set the timeout value based on the received time interval information.

In the case where the value of the timer 111 is less than or equal to a predetermined value (NO at S413), the NFC unit 108 next determines whether NFC polling is being received (S414). The NFC unit 108, in the case where NFC polling is being received (YES at S414), returns a response to the NFC polling (S415). Here, the response may be a logical information frame, or may be a simple ack signal in an electromagnetic field. Furthermore, the NFC unit 108 resets the counter of the timer 111 (S416). Furthermore, if possible, the NFC unit 108 sends power received by NFC polling to the power storage unit 112 and charges the power storage unit 112. Note that the power with which the power storage unit 112 is charged is, for example, power of the electric field produced by NFC polling that is the left over after driving the NFC unit 108. The timer 111 can be operated continuously as a result of this power. Thereafter, the NFC unit 108 checks whether an NFC beacon has been received (S417), and if not received (NO at S417), returns the processing to S411. On the other hand, if the NFC unit 108 is receiving an NFC beacon (YES at S417), the processing shifts to the third processing which will be discussed later.

3. Processing when there is Reception Data

This processing involves activating the wireless LAN from the sleep state when there is data addressed to the STA 100 and receiving the data from the AP 120, and then causing the wireless LAN to enter the sleep state again after transmitting data if necessary. This processing will be described with reference to FIG. 6.

This processing is started in S417, upon receiving the NFC beacon (YES at S417). The NFC unit 108 issues a trigger for activating the wireless LAN functional unit 107, when the NFC beacon is received (S418). As a result, the wireless LAN functional unit 107 then enters the awake state from the sleep state (S419). The wireless LAN functional unit 107, upon entering the awake state, transmits a PS-Poll frame to the AP 120 (S420). This transmission processing is similar to processing that is executed, in general wireless LAN communication, in the case where the TIM included in the beacon indicates that data exists. That is, the STA 100 notifies the AP 120 that the wireless LAN functional unit 107 of the STA 100 has been activated from the sleep state, by the PS-Poll frame. The STA 100 is thereby able to notify the AP 120 that communication by wireless LAN is possible and that data reception preparation is completed.

After transmission of the PS-Poll frame, the wireless LAN functional unit 107 waits for data from the AP 120 (S421), and receives all data that should be received (S422). After all data that should be received has been received, the wireless LAN functional unit 107 sends a receive interrupt to the control unit 101 (S423). In response to this interrupt, the control unit 101 processes the received data (S424). The control unit 101 then determines whether there is any data to be transmitted as a result of this processing (S425) and, if data to be transmitted exists (YES at S425), transmits the data using the wireless LAN functional unit 107 (S426). On the other hand, in the case where data to be transmitted does not exist (NO at S425), the control unit 101 notifies the AP that the wireless LAN will enter the sleep state (S427). Thereafter, the STA 100 returns the processing to the first processing (S409 of FIG. 4).

4. NFC Departure Detection and Related Processing

This processing involves causing the wireless LAN to enter the awake state from the sleep state, in the case where a timeout occurs during sleep without receiving NFC polling from a partner apparatus. This processing is executed in the case where a timeout occurs in S413 of FIG. 5. This processing will be described with reference to FIG. 7.

When a timeout occurs without receiving polling, the operating state of the control unit 101 returns to the awake state from the sleep state (S428). The control unit 101, which is now in the awake state, recognizes that the STA 100 has departed from the communicable range of the NFC unit 108 of the AP 120, and causes the wireless LAN functional unit 107 to enter the awake state from the sleep state (S429). The STA 100 then transmits a notification indicating that the NFC beacon function is disabled to the AP 120 by wireless LAN communication (S430). The AP 120 then resumes transmission of the beacon in response to having received the NFC beacon function disabled notification, and the STA 100 connects to the AP 120 by wireless LAN. The STA 100 is thereby able to cause the wireless LAN functional unit 107 to enter the sleep state on condition of being communicable with the AP 120 by NFC, and is able to ensure that control of the wireless LAN functional unit 107 is executable by NFC.

Note that methods of recognizing that the STA 100 has departed from the communicable range of the NFC unit 108 of the AP 120 include the following two methods, for example. The first method involves the control unit 101 reading out the time measured by the timer 111 and performing the determination, after returning to the awake state from the sleep state. That is, the control unit 101 recognizes that the STA 100 has departed from the communicable range of the NFC unit 108 of the AP 120 in the case where the measured time exceeds a predetermined value when the control unit 101 returns to the awake state from the sleep state. The second method involves the control unit 101 confirming the state of the wireless LAN functional unit 107 and the NFC unit 108. In this case, the control unit 101 determines that a timeout has occurred when the wireless LAN functional unit 107 is in the sleep state at the time that the control unit 101 returns to the awake state.

Operation of AP 120

Figure 8:
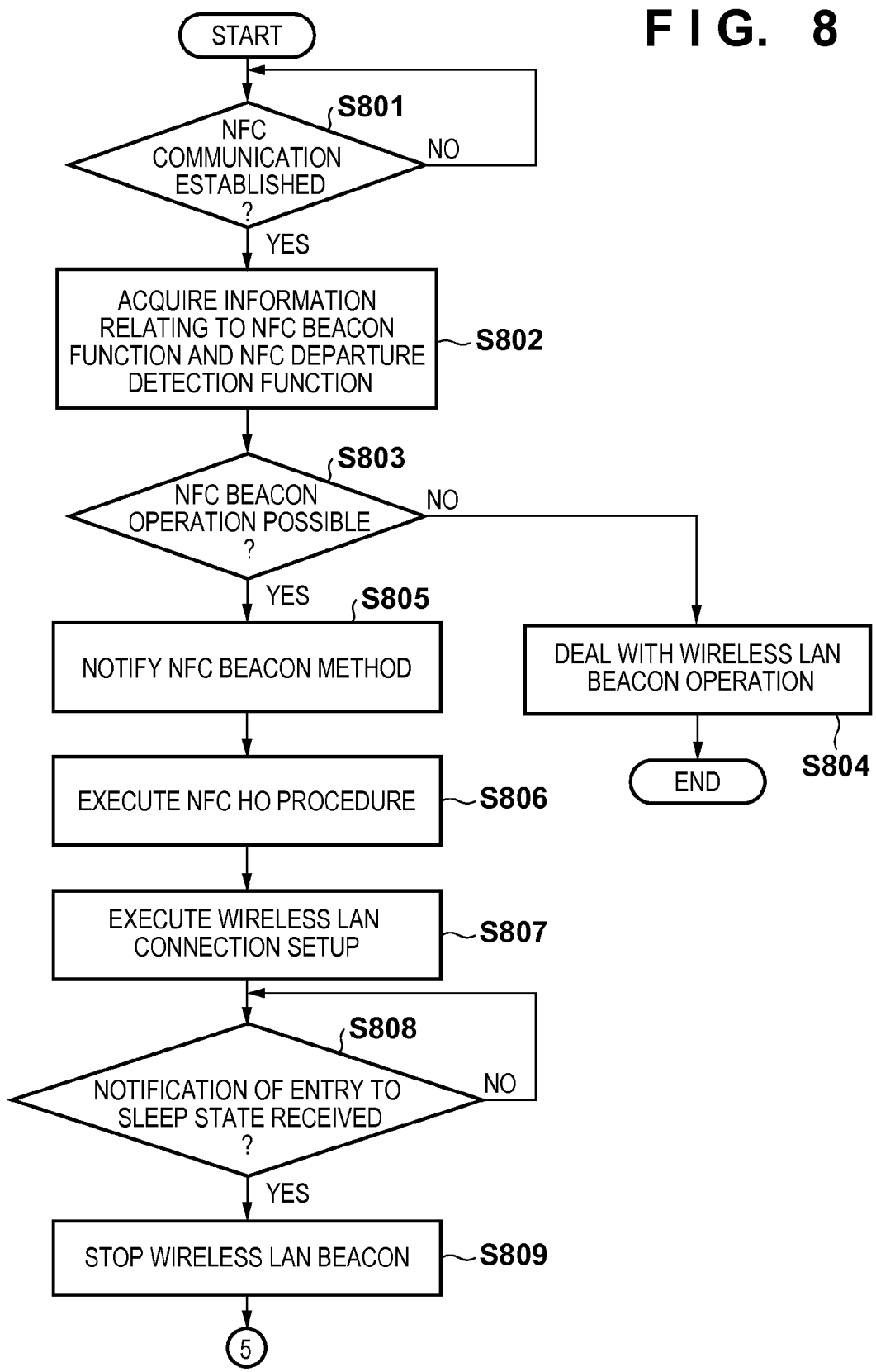
FIG. 8 is a flowchart showing first processing by the AP.

Next, the processing that is executed by the AP 120 will be described with reference to FIGS. 8 to 10. The processing that is executed by the AP 120 is broadly divided into four types of processing, similarly to the processing that is executed by the STA. The first processing is "processing until the terminal enters the sleep state", the second processing is "routine processing when terminal in the sleep state", the third processing is "processing when data addressed to the terminal is received", and the fourth processing is "NFC departure detection and related processing". This processing is executed by the control unit 101 of the AP 120, unless specifically stated otherwise.

1. Processing Until Terminal Enters Sleep State

This processing will be described with reference to FIG. 8. The AP 120 first detects whether the partner apparatus (STA 100) exists in the communicable range of the NFC unit 108 (S801). NFC communication is then executed with the STA 100, which exist in the communicable range, and information about "NFC beacon function" capability is acquired (S802).

If the STA 100 requests NFC beacon operation, the AP 120 then confirms whether a NFC beacon method that it has matches a method of the STA 100 (S803). If matching methods do not exist, the AP 120 determines that NFC beacon operation is not possible (NO at S803), notifies the NFC partner apparatus that a wireless LAN connection will be established using a wireless LAN beacon (S804), and ends the processing. On the other hand, the AP 120, in the case where it is determined that NFC beacon operation with the STA 100 is possible (YES at S803), notifies the NFC beacon method (S805).

The AP 120 then executes an NFC connection handover (HO) procedure (S806). Thereafter, the AP 120 executes wireless LAN connection setup according to the contents of the HO procedure (S807). Note that this procedure may be omitted in the case where wireless LAN connection setup has already been executed. The AP 120 then waits for notification of entering the sleep state from the STA 100, after the end of connection setup (S808). Note that, at this time, the AP 120 holds information relating to the connection of the wireless LAN functional unit 107 with the STA 100 in the storage unit 102. In this way, the STA 100 is able to perform communication by wireless LAN immediately after activation from the sleep state, by performing connection setup with the AP 120 before causing the wireless LAN functional unit 107 to enter the sleep state. Note that waiting for the notification of entering the sleep state is executed by the control unit 101 controlling the wireless LAN functional unit 107 or the NFC unit 108.

The AP 120, upon receiving notification of entering the sleep state from the STA 100 (YES at S808), then confirms that the STA 100 is the only connected wireless terminal, and stops transmission of the periodical wireless LAN beacon (S809). Note that notification of entering the sleep state may be executed via the NFC unit 108, or may be executed via the wireless LAN functional unit 107.

2. Routine Processing by Terminal in Sleep State

This processing will be described using FIG. 9. The AP 120, after stopping transmission of the wireless LAN beacon (S809), shifts to the present processing and operates NFC polling processing periodically (S810). This periodical operation is activated as a process or a task of software that operates in the control unit 101, and operates independently of the flow of shifting the processing to S811 which will be discussed later.

In polling processing, first a period timer is activated (S901). The control unit 101 realizes this timer function with the data processing unit 103, for example. Note that the difference from the timer operation of the STA 100 is that the control unit 101 of the AP 120 has not entered the sleep state. The AP 120 then transmits NFC polling (S902) and waits for the response of the STA 100 to this polling (S903). The AP 120, in the case where there is a response from the STA 100 (YES at S903), then resets the period timer (S904), and executes the third processing which will be discussed later. On the other hand, for the period that there is no response from the STA 100 (NO at S903), the AP 120 continually checks whether a timeout has occurred (S905). If the period timer reaches the timeout value (YES at S905), the AP 120 then advances the processing to S818, and executes the fourth processing which will be discussed later.

3. Processing when Data Addressed to Terminal Received

This processing will be described using FIG. 10. This processing is executed by the control unit 101 of the AP 120, in the case where data to be transmitted to the STA 100 exists in the AP 120. Note that, in the present embodiment, this processing is described as being executed in S810 of FIG. 9 in the case where an NFC polling response is received, but may be executed after S809 of FIG. 8 or during or after S810 of FIG. 9, for example.

In this processing, the AP 120 waits for data addressed to the STA 100 (S811). The AP 120, upon data addressed to the STA 100 being received (YES at S811), transmits an NFC beacon to the STA 100, using the NFC unit 108 (S812). Note that FIG. 10 shows exemplary processing in the case of waiting until data to be transmitted is acquired, although a configuration may be adopted in which the AP 120 returns to the processing of FIG. 9 and repeats periodical polling operation if data to be transmitted is not acquired. Also, a configuration may be adopted in which the processing of FIG. 10 is only executed in the case where the data to be transmitted has arrived, and the processing may repeated from S902, rather than shifting to the processing of FIG. 10, in the case where a response to the polling is received in FIG. 9, for example.

The AP 120 waits for a PS-Poll from the STA 100 after beacon transmission (S813). The AP 120, upon receiving a PS-Poll (YES at S813), then transmits the data addressed to the STA 100 with the wireless LAN functional unit 107 (S814). This transmission processing is continually performed until all the data addressed to the STA 100 is transmitted. The AP 120 then waits for data from the STA 100 after all the data has been transmitted (S815), and if data is received (YES at S815), transfers this data in accordance with the address information (S816), and advances the processing to S817. On the other hand, if data is not received from the STA 100 (NO at S815), the processing advances to S817. The AP 120 then repeats the processing of S815 and S816 until the notification of entering the sleep state is received from the STA 100 (S817). In S817, the AP 120, in the case where notification of entering the sleep state is received from the STA 100 (YES at S817), returns the processing to S810 of FIG. 9 and executes the NFC polling operation again, for example. Note that in this case, the AP 120 may return the processing to S811 and wait for data addressed to the STA 100.

4. NFC Departure Detection and Related Processing

Figure 9:
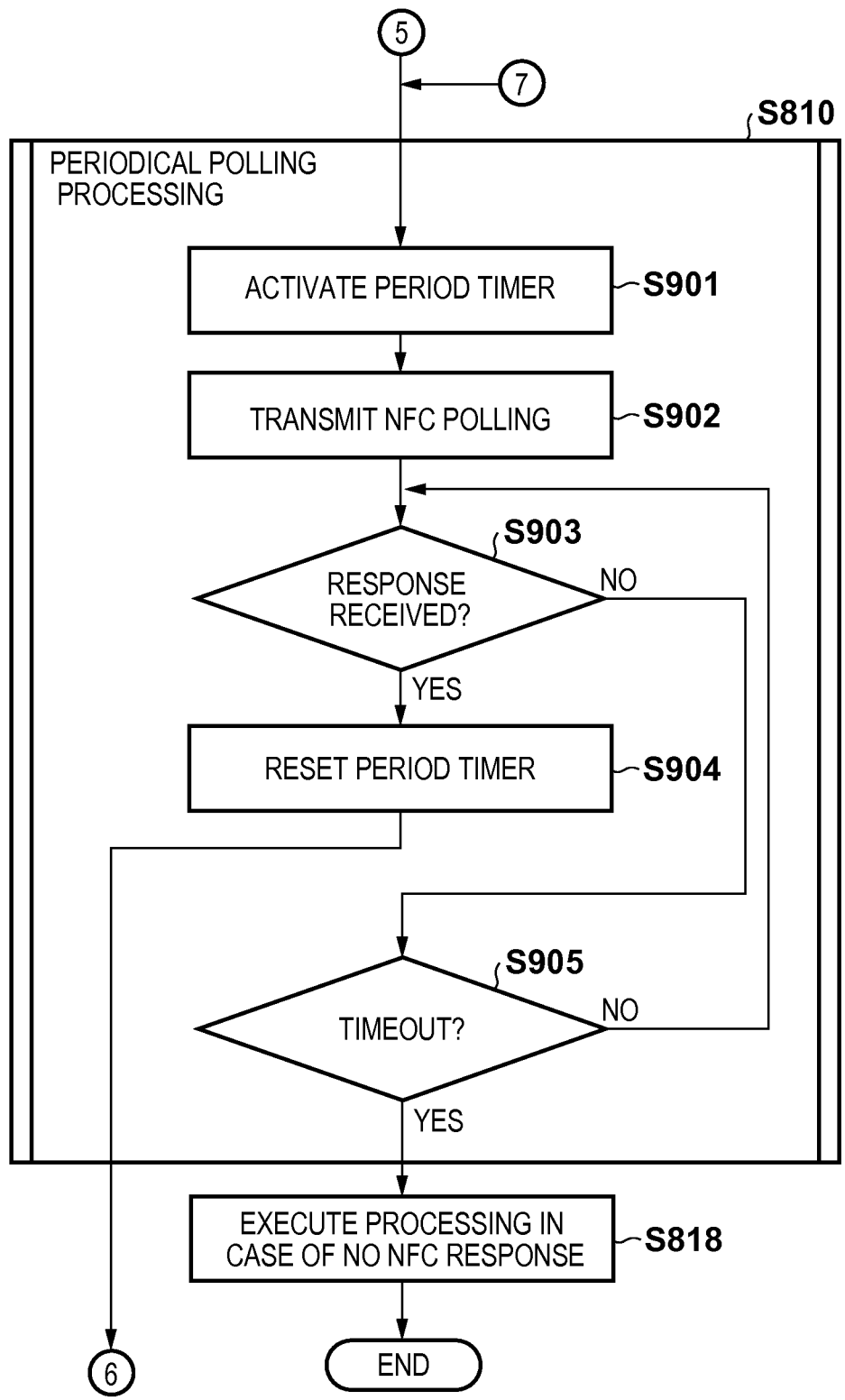
FIG. 9 is a flowchart showing second processing and fourth processing by the AP.
Figure 10:
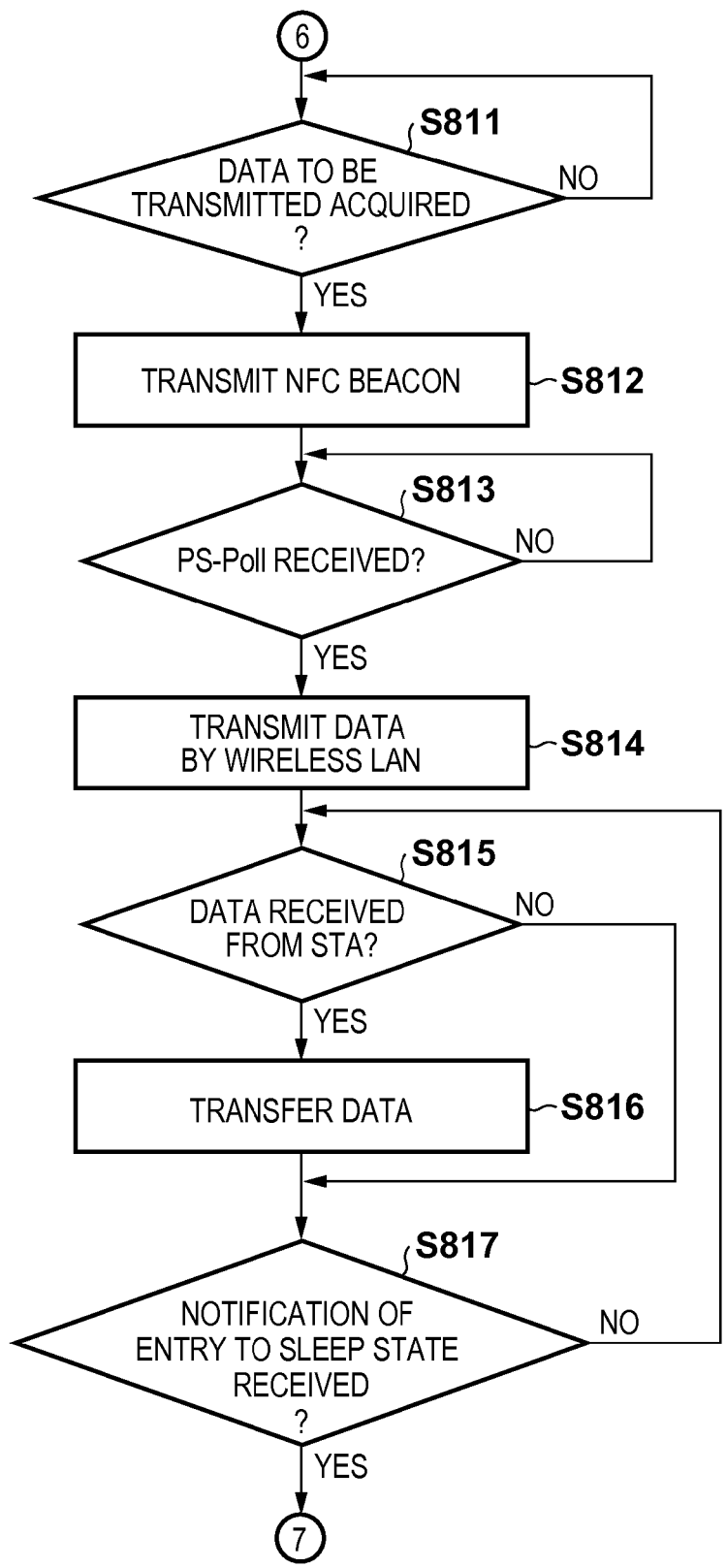
FIG. 10 is a flowchart showing third processing by the AP.

This processing is performed when the control unit 101 detects a timeout in S905 of FIG. 9. The AP 120, upon detecting a timeout (YES at S905), executes processing that is performed in the case where an NFC response is not received, as shown in FIG. 9 (S818). This processing involves, for example, outputting a warning message using the output unit 105. Note that a configuration may be adopted in which the AP 120 resumes periodically sending out the wireless LAN beacon and connects to the STA 100 by wireless LAN, rather than outputting a warning message.

Operations of System

Next, the flow of processing between the STA 100 and the AP 120 will be described using the sequence diagrams of FIGS. 11 to 13. FIGS. 11 and 12 are sequence diagrams regarding processing that is performed in the case where the STA 100 does not depart from the communicable range of the NFC unit 108 of the AP 120. FIG. 13 is a sequence diagram regarding processing for determining whether the STA 100 has departed from the communicable range of the NFC unit 108 of the AP 120.

First, processing in the case where the STA 100 has not departed from the communicable range of the NFC unit 108 of the AP 120 will be described using FIGS. 11 and 12. When processing is started, the STA 100 recognizes a sleep state setup operation by the user, and performs sleep state setup (F1001). The STA 100 and the AP 120 then detect the NFC proximity state (F1002), and establish a connection using NFC. Thereafter, the STA 100 performs notification of "NFC beacon function" and "NFC departure detection function" capabilities (F1003), and the AP 120 determines the method of the NFC beacon function and notifies the STA 100 (F1004). After notifying the method of the NFC beacon function, the AP 120 and the STA 100 perform the NFC connection handover (HO) procedure (F1005), and perform wireless LAN connection setup (F1006).

The STA 100 then transmits notification of entering the sleep state to the AP 120 after completing the wireless LAN connection setup (F1007). The AP 120, upon receiving notification of entering the sleep state, then stops sending out the wireless LAN beacon (F1008). On the other hand, the STA 100 enables the NFC beacon function after transmitting the notification of entering the sleep state (F1009). Note that it is assumed that the NFC beacon function of the AP 120 is already enabled in F1004. Thereafter, the STA 100 causes the wireless LAN functional unit 107 to transition to the sleep state (F1010), and furthermore causes the control unit 101 to enter the sleep state (F1011).

In this state, in the STA 100, the control unit 101 and the wireless LAN functional unit 107 will have stopped functioning, and only the NFC beacon function (and the timer 111) will be active. In this case, the NFC beacon function can be activated by an electric field or magnetic field that is produced by the AP 120, and power for the timer 111 can similarly be obtained from the AP 120 by the NFC unit 108. Accordingly, it becomes possible for the STA 100 to wait for data without consuming power. Also, it becomes possible for the AP 120 to suppress power consumption, since sending out of the wireless LAN beacon is stopped. Also, in the AP 120, as long as there is no data to be transmitted to or received from the STA 100, is able to stop (put to sleep) the wireless LAN function. Accordingly, it becomes possible for the AP 120 to greatly reducing power relating to wireless LAN.

Here, it is assumed in FIG. 12, it is assumed that after the STA 100 has caused the control unit 101 and the wireless LAN functional unit 107 to enter the sleep state, the AP 120 receives data addressed to the STA 100 (F1012). In this case, the AP 120 transmits the NFC beacon to the STA 100 (F1013). With this NFC beacon, the wireless LAN functional unit 107 of the STA 100, as a result of being triggered (F1014), enters the awake state (F1015), and transmits the PS-Poll (F1016). The AP 120, upon receiving the PS-Poll, transmits data to the STA 100 (F1017). When the wireless LAN functional unit 107 of the STA 100 detects the end of data reception (F1018), the control unit 101 of the STA 100 enters the awake state (F1019). Thereafter, if necessary, the STA 100 transmits data to the AP 120 (F1020), and confirms that data transmission has ended (F1021). Thereafter, the STA 100 transmits notification of the wireless LAN entering the sleep state to the AP 120 (F1022). After notification, the wireless LAN functional unit 107 of the STA 100 enters the sleep state (F1023), and then the control unit 101 of the STA 100 enters the sleep state (F1024).

Next, processing for determining whether the STA 100 has departed from the communicable range of the NFC unit 108 of the AP 120 will be described with reference to FIG. 12. In this processing, first, the AP 120 transmits NFC polling to the STA 100 (F1025), and the STA 100 transmits a polling response to the AP 120 (F1026). In this case, since the STA 100 is considered to exist in the communicable range of the NFC unit 108 of the AP 120, the timer 111 of the STA 100 is then reset (F1027).

Here, it is assumed that the STA 100 departs from the communicable range of the NFC unit 108 of the AP 120 by having moved or the like, and that NFC communication is disconnected (F1028). In this case, the NFC polling transmitted by the AP 120 will not be received by the STA 100, and the AP 120 will not receive a response from the STA 100 (F1029). In this way, the AP 120 confirms that no response has been received from the STA 100 as a result of the timer timing out (F1030), and detects that the STA 100 has departed from the communicable range of the NFC unit 108 of the AP 120. On the other hand, in the STA 100, since NFC polling is not received, the timer 111 exceeds the predetermined value and a timeout occurs (F1031). Then the control unit 101 of the STA 100, as a result of being interrupted (F1032), transitions to the awake state (F1033). The wireless LAN functional unit 107 of the STA 100 also transitions to the awake state (F1034). The STA 100 then transmits a notification indicating that the NFC beacon function is disabled to the AP 120 (F1035), and thereafter the STA 100 and the AP 120 execute similar processing to when wireless LAN communication is executed in the case where NFC communication is not possible (F1036). That is, the AP 120 resumes sending out of the wireless LAN beacon, and the STA 100 connects to the AP 120 by wireless LAN.

In this way, the availability of communication using NFC can be linked to the wireless LAN entering the sleep state, by placing the wireless LAN in the sleep state in the case where the STA 100 exists in the communicable range of the NFC unit 108 of the AP 120. In this way, in the case where communication using NFC cannot be performed, a state where communication is possible by wireless LAN can be maintained, instead of placing the wireless LAN in the sleep state. Also, it becomes possible to suppress power consumption while securing a state where communication can be performed by wireless LAN, by placing the wireless LAN in the sleep state when communication can be performed using NFC. Furthermore, communication having high power efficiency becomes possible in the case where communication can be performed using NFC after the wireless LAN has entered the sleep state, by only canceling the sleep state in the case where there is data to be transmitted.

Note that, in the embodiments, reducing power consumption by stopping transmission of signals that are transmitted periodically, such as the wireless LAN beacon and the like, and transitioning to the sleep state when communication apparatuses are able to communicate using NFC was described. However, the embodiments are merely for illustrative purposes, and the present invention is not limited thereto. For example, a configuration may be adopted in which power consumption is reduced by stopping or restricting transmission of predetermined signals other than signals that are transmitted periodically such as the beacon or the like, when communication apparatuses are able to communicate using NFC. For example, a configuration may be adopted in which transmission of signals such as a wireless LAN probe request or probe response is stopped or restricted, when communication apparatuses are able to communicate using NFC.

According to the present invention, it becomes possible to reduce power usage in apparatuses that are capable of utilizing a plurality of communication methods.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-133093 filed on Jun. 25, 2013, which is hereby incorporated by reference herein in its entirety.

What is claimed is:

1. A communication apparaus, comprising:
a first communication unit configured to perform wireless communication using a first communication method;
a second communication unit configured to perform wireless communication using a second communication method whose power consumption is less than power consumption used when the first communication unit performs wireless communication;
a determination unit configured to determine disconnection of a wireless connection between the communication apparatus and a partner apparatus via the second communication unit; and
a control unit configured to control, in a case where the first communication unit is in a sleep state whose power consumption is less than power consumption in an awake mode when the determination unit determines the disconnection, the first communication unit so that a mode of the first communication unit is switched from the sleep mode to the awake mode.

2. The communication apparatus according to claim 1, further comprising:
a transmission unit configured to, in a case where there is data to be transmitted to the partner apparatus and the first communication unit is in the sleep state, transmit, by the second communication unit, a signal indicating that there is data to be transmitted using the first communication method,
wherein the communication apparatus is configured to transmit the data to the partner apparatus using the first communication unit, in a case where a response to the signal is received from the partner apparatus via the first communication unit.

3. The communication apparatus according to claim 1, further comprising:
a setting unit configured to perform setup with the partner apparatus in order to communicate using the first communication unit, in a case where a wireless connection between the communication apparatus and the partner apparatus via the second communication unit is established.

4. The communication apparatus according to claim 3, further comprising:
wherein the control unit is configured to control the first communication unit so that the first communication unit enters the sleep state after the setup is completed.

5. The communication apparatus according to claim 1, wherein the determination unit is configured to determine the disconnection of a wireless connection between the communication apparatus and a partner apparatus via the second communication unit, by periodically transmitting a confirmation signal to the partner apparatus using the second communication unit, and receiving a response to the confirmation signal from the partner apparatus.

6. The communication apparatus according to claim 1, wherein the control unit is configured to control the first communication unit to resume transmission of a predetermined signal, in a case where a wireless connection between the communication apparatus and the partner apparatus via the second communication apparatus is disconnected.

7. The communication apparatus according to claim 1, wherein, in a case where information for starting communication using the first communication unit is communicated with the partner apparatus by the second communication unit while the first communication unit is in the sleep state, and in a case where the mode of the first communication unit is switched from the sleep mode to the awake mode,
the communication apparatus is configured to receive data from the partner apparatus using the first communication unit.

8. The communication apparatus according to claim 7, wherein the communication apparatus transmits a response to the information for starting communication using the first communication unit received from the partner apparatus by the second communication unit to the partner apparatus using the first communication unit.

9. The communication apparatus according to claim 1, wherein the determination unit is further configured to determines whether the partner apparatus is capable of determining whether the communication apparatus exists in the communicable range of the third communication unit of the partner apparatus, and the control unit is configured to control the first communication unit to enter the sleep state, in a case where the partner apparatus is capable of determining whether the communication apparatus exists in the communicable range of the third communication unit of the partner apparatus, and it is determined that the communication apparatus exists in the communicable range.

10. The communication apparatus according to claim 1, wherein the first communication unit performs wireless communication as a station that is to connects to an access point.

11. The communication apparatus according to claim 1, wherein the first communication method is a method compliant with IEEE 802.11 standard, and the second communication method is Near Field Communication.

12. The communication apparatus according to claim 1, wherein the first communication unit performs wireless communication as an access point that periodically transmits a beacon.

13. The communication apparatus according to claim 12, wherein the first communication unit stops sending the beacon in the sleep state.

14. The communication apparatus according to claim 1, wherein the determination unit further determines establishment of a wireless connection between the communication apparatus and the partner apparatus via the second communication unit, the control unit controls, in a case where the determination unit determines that a wireless connection between the communication apparatus and the partner apparatus via the second communication unit is established, the first communication unit so that the mode of the first communication unit is switched from the awake mode to the sleep mode.

15. The communication apparatus according to claim 14, wherein, in a case where the first communication unit enters the sleep state by being controlled by the control unit, information included in the beacon is transmitted to the partner apparatus via the second communication unit.

16. The communication apparatus according to claim 1, wherein the awake state is a state in which the first communication unit can perform wireless communication, and the sleep mode is a state in which the first communication unit does not perform wireless communication.

17. A communication apparatus having a first communication unit configured to communicate wirelessly with another apparatus and a second communication unit configured to perform at least one of power reception from another apparatus or communication with the other apparatus by an electric field or magnetic field produced by the other apparatus, comprising:

a determination unit configured to determine whether the communication apparatus exists in a communicable range of a third communication unit of the partner apparatus, which is corresponding to the second communication unit;

a control unit configured to control the first communication unit to enter a sleep state, in a case where it is determined that the communication apparatus exists in the communicable range, and a timer configured to be reset in response to a confirmation signal from the partner apparatus being received by the second communication unit after the first communication unit has entered the sleep state, and to measure elapsed time after being reset, wherein the determination unit is configured to determine that the communication apparatus no longer exists in the communicable range of the third communication unit of the partner apparatus, in a case where the time measured by the timer exceeds a predetermined value, and wherein the control unit is configured to control the first communication unit that has entered the sleep state so as to activate the first communication unit, in a case where the communication apparatus no longer exists in the communicable range of the third communication unit of the partner apparatus.

18. The communication apparatus according to claim 17, wherein the predetermined value is set to be greater than a time interval at which the partner apparatus periodically transmits the confirmation signal.

19. The communication apparatus according to claim 17, wherein the timer is configured to operate with power obtained by the power reception.

20. A method of controlling a communication apparatus that comprises a first communication unit configured to perform wireless communication using a first communication method and a second communication unit configured to perform wireless communication using a second communication method whose power consumption is less than power consumption used when the first communication unit performs wireless communication, the method comprising:

determining, disconnection of a wireless connection between the communication apparatus and a partner apparatus via the second communication unit; and controlling, in a case where the first communication unit is in a sleep state whose power consumption is less than power consumption in an awake mode when the disconnection is determined, the first communication unit so that a mode of the first communication unit is switched from the sleep mode to the awake mode.

21. A non-transitory computer-readable storage medium storing a computer program for causing a computer provided with a first communication unit configured to perform wireless communication using a first communication method and a second communication unit configured to perform wireless communication using a second communication method whose power consumption is less than power consumption used when the first communication unit performs wireless communication to execute:

determining disconnection of a wireless connection between the communication apparatus and a partner apparatus via the second communication; and controlling, in a case where the first communication unit is in a sleep state whose power consumption is less than power consumption in an awake mode when the disconnection is determined, the first communication unit so that a mode of the first communication unit is switched from the sleep mode to the awake mode.

* * * * *